US006222874B1

(12) United States Patent
Walley et al.

(10) Patent No.: US 6,222,874 B1
(45) Date of Patent: *Apr. 24, 2001

(54) FREQUENCY ACQUISITION METHOD FOR DIRECT SEQUENCE SPREAD SPECTRUM SYSTEMS

(75) Inventors: John S. Walley, Lake Forest; Quang D. Vo, San Dimas, both of CA (US)

(73) Assignee: Conexant Systems, Inc., Newport Beach, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/447,538

(22) Filed: Jul. 10, 1998

Related U.S. Application Data

(62) Division of application No. 08/568,058, filed on Dec. 6, 1995, now Pat. No. 5,799,034.

(51) Int. Cl.[7] .................................................. H04B 1/707

(52) U.S. Cl. .......................... 375/149; 375/344; 370/514

(58) Field of Search .................................... 375/140, 149, 375/342, 344, 147, 355, 365, 367; 370/514

(56) References Cited

U.S. PATENT DOCUMENTS

| | | | | |
|---|---|---|---|---|
| 4,896,336 | * | 1/1990 | Henely et al. | 329/308 |
| 5,042,050 | * | 8/1991 | Owen | 375/130 |
| 5,732,111 | * | 3/1998 | Walley | 375/344 |
| 5,799,034 | * | 8/1998 | Walley et al. | 375/206 |
| 5,892,792 | * | 4/1999 | Walley | 375/206 |

* cited by examiner

Primary Examiner—Temesghen Ghebretinsae
(74) Attorney, Agent, or Firm—Foley & Lardner

(57) ABSTRACT

A frequency acquisition and compensation device and method for direct sequence spread spectrum communications systems has an identification (ID) sequence in an acquisition frame which is received by a receiving station and an ID sequence stored in an ID register. A received acquisition frame is demodulated using dot product and cross product demodulation. An ID detector detects the ID sequence in the demodulated dot product, cross product, or inverse cross product acquisition frame. When the ID is detected by the dot product demodulator, the receive frame timing is adjusted to coincide with a time interval when the ID was detected. Also, when the ID sequence stored in the ID register matches either the dot product, cross product or inverted cross product of the received ID sequence, the system microcontroller updates the automatic frequency control value.

6 Claims, 13 Drawing Sheets

| |I1| | |I0| | |Q1| | |Q0| | ANGLE | A3 | A2 | A1 | A0 | MAG.² | M2 | M1 | M0 |
|---|---|---|---|---|---|---|---|---|---|---|---|---|
| 0 | 0 | 0 | 0 | 45 | 1 | 0 | 0 | 0 | 2 => 10 | 0 | 0 | 0 |
| 0 | 1 | 0 | 0 | 16.875 | 0 | 0 | 1 | 1 | 10 | 0 | 0 | 0 |
| 1 | 0 | 0 | 0 | 11.25 | 0 | 0 | 1 | 0 | 26 | 0 | 1 | 0 |
| 1 | 1 | 0 | 0 | 5.625 | 0 | 0 | 0 | 1 | 50 | 1 | 0 | 0 |
| 0 | 0 | 0 | 1 | 73.125 | 1 | 1 | 0 | 1 | 10 | 0 | 0 | 0 |
| 0 | 1 | 0 | 1 | 45 | 1 | 0 | 0 | 0 | 18 | 0 | 0 | 1 |
| 1 | 0 | 0 | 1 | 33.75 | 0 | 1 | 1 | 0 | 34 | 0 | 1 | 1 |
| 1 | 1 | 0 | 1 | 22.5 | 0 | 1 | 0 | 0 | 58 | 1 | 0 | 1 |
| 0 | 0 | 1 | 0 | 78.75 | 1 | 1 | 1 | 0 | 26 | 0 | 1 | 0 |
| 0 | 1 | 1 | 0 | 56.25 | 1 | 0 | 1 | 0 | 34 | 0 | 1 | 1 |
| 1 | 0 | 1 | 0 | 45 | 1 | 0 | 0 | 0 | 50 | 1 | 0 | 0 |
| 1 | 1 | 1 | 0 | 33.75 | 0 | 1 | 1 | 0 | 74 | 1 | 1 | 0 |
| 0 | 0 | 1 | 1 | 84.375 | 1 | 1 | 1 | 1 | 50 | 1 | 0 | 0 |
| 0 | 1 | 1 | 1 | 67.5 | 1 | 1 | 0 | 0 | 58 | 1 | 0 | 1 |
| 1 | 0 | 1 | 1 | 56.25 | 1 | 0 | 1 | 0 | 74 | 1 | 1 | 0 |
| 1 | 1 | 1 | 1 | 45 | 1 | 0 | 0 | 0 | 98 | 1 | 1 | 1 |

| I2 | Q2 | QUADRANT | A5 | A4 |
|---|---|---|---|---|
| 0 | 0 | 0 - 90 | 0 | 0 |
| 1 | 0 | 90 - 180 | 0 | 1 |
| 1 | 1 | 180 - 270 | 1 | 0 |
| 0 | 1 | 270 - 360 | 1 | 1 |

FIG. 5

| A5 | A4 | QUADRANT | I2 | Q2 |
|----|----|----------|----|----|
| 0  | 0  | 0 - 90   | 0  | 0  |
| 0  | 1  | 90 - 180 | 1  | 0  |
| 1  | 0  | 180 - 270| 1  | 1  |
| 1  | 1  | 270 - 360| 0  | 1  |

| | | | | | | M2 = 0 | | | | M2 = 1 | | | |
|----|----|----|----|----|----|----|----|----|----|----|----|----|----|
| M1 | M0 | A3 | A2 | A1 | A0 | \|I1\| | \|I0\| | \|Q1\| | \|Q0\| | \|I1\| | \|I0\| | \|Q1\| | \|Q0\| |
| 0 | 0 | 0 | 0 | 0 | 0 | 0 | 1 | 0 | 0 | 0 | 1 | 0 | 0 |
|   |   | 0 | 0 | 0 | 1 | 0 | 1 | 0 | 0 | 0 | 1 | 0 | 0 |
|   |   | 0 | 0 | 1 | 0 | 0 | 1 | 0 | 0 | 0 | 1 | 0 | 0 |
|   |   | 0 | 0 | 1 | 1 | 0 | 1 | 0 | 0 | 0 | 1 | 0 | 1 |
|   |   | 0 | 1 | 0 | 0 | 0 | 1 | 0 | 0 | 0 | 1 | 0 | 1 |
|   |   | 0 | 1 | 0 | 1 | 0 | 1 | 0 | 0 | 0 | 1 | 0 | 1 |
|   |   | 0 | 1 | 1 | 0 | 0 | 1 | 0 | 0 | 0 | 0 | 1 | 0 |
|   |   | 0 | 1 | 1 | 1 | 0 | 1 | 0 | 1 | 0 | 0 | 1 | 0 |
|   |   | 1 | 0 | 0 | 0 | 0 | 1 | 0 | 1 | 0 | 0 | 1 | 0 |
|   |   | 1 | 0 | 0 | 1 | 0 | 0 | 0 | 1 | 0 | 0 | 1 | 0 |
|   |   | 1 | 0 | 1 | 0 | 0 | 0 | 0 | 1 | 1 | 1 | 1 | 1 |
|   |   | 1 | 0 | 1 | 1 | 0 | 0 | 0 | 1 | 1 | 1 | 1 | 1 |
|   |   | 1 | 1 | 0 | 0 | 0 | 0 | 0 | 1 | 1 | 1 | 1 | 1 |
|   |   | 1 | 1 | 0 | 1 | 0 | 0 | 0 | 1 | 1 | 0 | 1 | 1 |
|   |   | 1 | 1 | 1 | 0 | 0 | 0 | 0 | 1 | 1 | 0 | 1 | 1 |
|   |   | 1 | 1 | 1 | 1 | 0 | 0 | 0 | 1 | 1 | 0 | 1 | 1 |
| 0 | 1 | 0 | 0 | 0 | 0 | 1 | 0 | 0 | 0 | 1 | 1 | 0 | 0 |
|   |   | 0 | 0 | 0 | 1 | 1 | 0 | 0 | 0 | 1 | 1 | 0 | 0 |
|   |   | 0 | 0 | 1 | 0 | 1 | 0 | 0 | 0 | 1 | 1 | 0 | 0 |
|   |   | 0 | 0 | 1 | 1 | 0 | 1 | 0 | 0 | 1 | 1 | 0 | 1 |
|   |   | 0 | 1 | 0 | 0 | 0 | 1 | 0 | 0 | 1 | 1 | 0 | 1 |
|   |   | 0 | 1 | 0 | 1 | 0 | 1 | 0 | 1 | 1 | 1 | 0 | 1 |
|   |   | 0 | 1 | 1 | 0 | 0 | 1 | 0 | 1 | 1 | 1 | 1 | 0 |
|   |   | 0 | 1 | 1 | 1 | 0 | 1 | 0 | 1 | 1 | 0 | 1 | 0 |
|   |   | 1 | 0 | 0 | 0 | 0 | 1 | 0 | 1 | 1 | 0 | 1 | 0 |
|   |   | 1 | 0 | 0 | 1 | 0 | 1 | 0 | 1 | 1 | 0 | 1 | 1 |
|   |   | 1 | 0 | 1 | 0 | 0 | 1 | 0 | 1 | 0 | 1 | 1 | 1 |
|   |   | 1 | 0 | 1 | 1 | 0 | 0 | 0 | 1 | 0 | 1 | 1 | 1 |

FIG. 6A

| | | | | | | | | | | | |
|---|---|---|---|---|---|---|---|---|---|---|---|
| 1 | 1 | 0 | 0 | 0 | 0 | 0 | 1 | 0 | 1 | 1 | 1 |
| 1 | 1 | 0 | 1 | 0 | 0 | 1 | 0 | 0 | 0 | 1 | 1 |
| 1 | 1 | 1 | 0 | 0 | 0 | 1 | 0 | 0 | 0 | 1 | 1 |
| 1 | 1 | 1 | 1 | 0 | 0 | 1 | 0 | 0 | 0 | 1 | 1 |
| 0 | 0 | 0 | 0 | 0 | 1 | 0 | 0 | 0 | 1 | 1 | 0 | 0 |
| 0 | 0 | 0 | 1 | 1 | 0 | 0 | 0 | 1 | 1 | 0 | 0 |
| 0 | 0 | 1 | 0 | 1 | 0 | 0 | 0 | 1 | 1 | 0 | 1 |
| 0 | 0 | 1 | 1 | 1 | 0 | 0 | 0 | 1 | 1 | 0 | 1 |
| 0 | 1 | 0 | 0 | 1 | 0 | 0 | 1 | 1 | 1 | 1 | 0 |
| 0 | 1 | 0 | 1 | 1 | 0 | 0 | 1 | 1 | 1 | 1 | 0 |
| 0 | 1 | 1 | 0 | 1 | 0 | 0 | 1 | 1 | 1 | 1 | 0 |
| 0 | 1 | 1 | 1 | 0 | 1 | 0 | 1 | 1 | 1 | 1 | 0 |
| 1 | 0 | 0 | 0 | 0 | 1 | 0 | 1 | 0 | 1 | 1 | 1 |
| 1 | 0 | 0 | 1 | 0 | 1 | 1 | 0 | 1 | 0 | 1 | 1 |
| 1 | 0 | 1 | 0 | 0 | 1 | 1 | 0 | 1 | 0 | 1 | 1 |
| 1 | 0 | 1 | 1 | 0 | 1 | 1 | 0 | 0 | 1 | 1 | 1 |
| 1 | 1 | 0 | 0 | 0 | 0 | 1 | 0 | 0 | 0 | 1 | 1 |
| 1 | 1 | 0 | 1 | 0 | 0 | 1 | 0 | 0 | 0 | 1 | 1 |
| 1 | 1 | 1 | 0 | 0 | 0 | 1 | 0 | 0 | 0 | 1 | 1 |
| 1 | 1 | 1 | 1 | 0 | 0 | 1 | 0 | 0 | 0 | 1 | 1 |
| 1 | 1 | 0 | 0 | 0 | 0 | 1 | 0 | 0 | 0 | 1 | 1 | 0 | 0 |
| 0 | 0 | 0 | 1 | 1 | 0 | 0 | 0 | 1 | 1 | 0 | 0 |
| 0 | 0 | 1 | 0 | 1 | 0 | 0 | 0 | 1 | 1 | 0 | 1 |
| 0 | 0 | 1 | 1 | 1 | 0 | 0 | 0 | 1 | 1 | 0 | 1 |
| 0 | 1 | 0 | 0 | 1 | 0 | 0 | 1 | 1 | 1 | 1 | 0 |
| 0 | 1 | 0 | 1 | 1 | 0 | 0 | 1 | 1 | 1 | 1 | 0 |
| 0 | 1 | 1 | 0 | 1 | 0 | 0 | 1 | 1 | 1 | 1 | 0 |
| 0 | 1 | 1 | 1 | 1 | 0 | 0 | 1 | 1 | 1 | 1 | 1 |
| 1 | 0 | 0 | 0 | 0 | 1 | 1 | 0 | 1 | 1 | 1 | 1 |
| 1 | 0 | 0 | 1 | 0 | 1 | 1 | 0 | 1 | 0 | 1 | 1 |
| 1 | 0 | 1 | 0 | 0 | 1 | 1 | 0 | 1 | 0 | 1 | 1 |
| 1 | 0 | 1 | 1 | 0 | 1 | 1 | 0 | 1 | 0 | 1 | 1 |
| 1 | 1 | 0 | 0 | 0 | 0 | 1 | 0 | 0 | 0 | 1 | 1 |
| 1 | 1 | 0 | 1 | 0 | 0 | 1 | 0 | 0 | 1 | 1 | 1 |
| 1 | 1 | 1 | 0 | 0 | 0 | 1 | 0 | 0 | 0 | 1 | 1 |
| 1 | 1 | 1 | 1 | 0 | 0 | 1 | 0 | 0 | 0 | 1 | 1 |

FIG. 6B

FREQUENCY ACQUISITION METHOD FOR DIRECT SEQUENCE SPREAD SPECTRUM SYSTEMS

This is a divisional application of application Ser. No. 08/568,058, filed Dec. 6, 1995, now U.S. Pat. No. 5,799,034.

BACKGROUND OF THE INVENTION

1. Field of the Invention

The present invention relates generally to improvements in digital spread spectrum systems and, more particularly, pertains to a new and improved device and method for frequency acquisition and compensation for digital cordless direct sequence spread spectrum telephones.

2. Description of Related Art

Cordless telephones currently exist which provide good speech quality using analog frequency modulation in the 46/49 MHz band. These analog cordless phones are inexpensive and have become a common replacement for the traditional corded phones. However, analog cordless phones have a limited useful range, requiring the handset to be operated in close proximity to the base station. Also, analog cordless phones are susceptible to interference and lack adequate security for protecting the privacy of conversations.

One solution to improve cordless telephone performance is to use digital modulation and coding techniques. Digital modulation and coding offer more robust voice communication over a radio channel than analog modulation. Digital modulation also provides a more noise-free conversation by suppressing co-channel and adjacent channel interference. Additionally, with digital modulation and coding, effective scrambling codes can be added to improve phone security.

Another solution is to use the 902–928 MHz Industrial, Medical and Scientific (ISM) band for radio transmission and reception. The Federal Communications Commission (FCC) allows transmitters in this band to have increased power levels, as compared to the 46/49 MHz band, which increases the useful operating range. At the highest transmit power levels, which are needed by a digital phone to overcome interference, the FCC requires that the phone system implement spread spectrum modulation.

In Direct Sequence Spread Spectrum (DSSS) systems, such as digital cordless telephones operating in the ISM band, it is desirable to use very inexpensive crystal oscillator references in both the handset and base station in order to reduce overall system cost. However, the cheaper the crystals, the greater the inaccuracy in the oscillator frequency.

SUMMARY OF THE INVENTION

Thus, it is an object of the present invention to provide an improved frequency acquisition and compensation device and method which allows the use of inexpensive and inaccurate crystal references on the order of ±100 ppm, such that frequency errors three times the normal limits can be tolerated without any loss of performance.

An Identification (ID) sequence is used for frequency acquisition and is included in every Acquisition frame (A-frame). The dot product, cross product and inverted cross product of the ID sequence is determined and compared with an ID sequence stored in the receiver. This allows for simple detection of the incoming signal with ±135 degrees of phase change at the demodulator due to frequency errors, with less than 3 db loss. In addition, by knowing whether the cross, inverted cross, or dot product detector found a match with the incoming ID sequence, the estimate of the frequency error can be obtained and used to update the frequency compensation during the rest of the message. Thus, there is no need to track out frequency errors while the phone is sleeping with up to 30 ppm errors in the disclosed system.

BRIEF DESCRIPTION OF THE DRAWINGS

The exact nature of this invention as well as the objects and advantages, will become readily apparent from consideration of the following specification as illustrated in the accompanying drawings, in which like reference numerals designate like parts throughout the figures thereof, and wherein:

FIG. 5 is a table showing the conversion mapping for converting I and Q signals from rectangular to polar form:

FIG. 6 is a table showing the conversion mapping for converting Magnitude and Phase signals form polar to rectangular form;

DETAILED DESCRIPTION OF THE PREFERRED EMBODIMENTS

The following description is provided to enable any person skilled in the art to make and use the invention and sets forth the best modes contemplated by the inventors for carrying out the invention. Various modifications, however, will remain readily apparent to those skilled in the art, since the basic principles of the present invention have been defined herein specifically to provide a device and method for frequency error estimation, calibration and removal for digital cordless telephones using Direct Sequence Spread Spectrum (DSSS).

Figure 1:
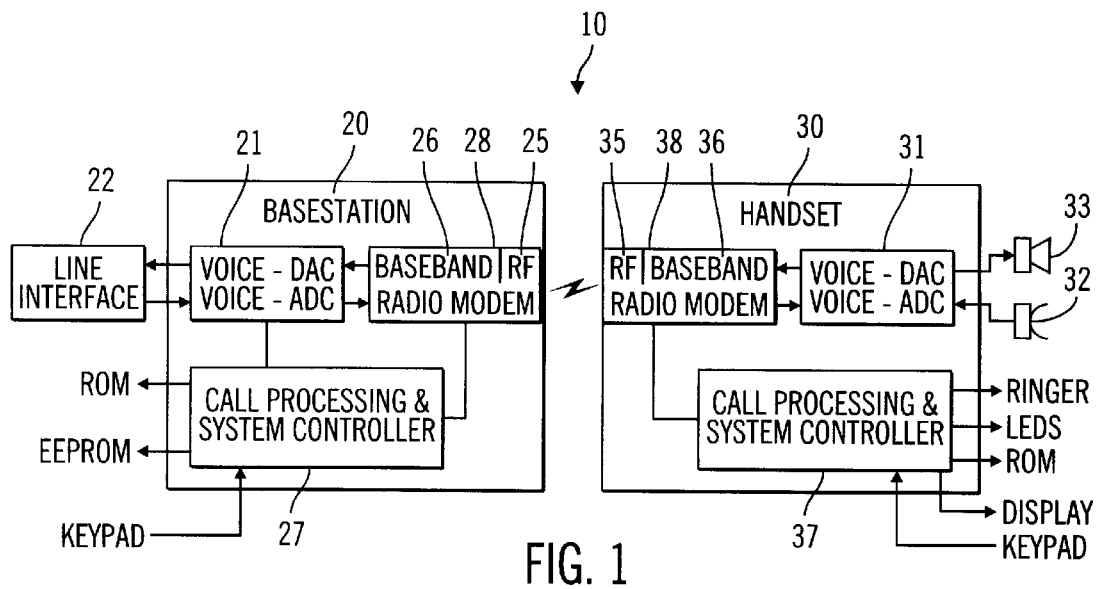
FIG. 1 is a system-level diagram of a base station and a handset that collectively form a digital cordless telephone of the present invention.

As shown in FIG. 1, a digital cordless telephone (DCT) 10 according to the present invention comprises a base station 20 and at least one handset 30. The DCT 10 is designed to provide full duplex voice communication between the handset 30 and the public switched telephone network (PSTN) (not shown) by way of an RF link through the base station 20.

The base station 20 and the handset 30 both include a Radio Modem 28, 38, respectively, which are composed of a Radio Frequency (RF) Modem 25, 35 and a Baseband Modem 26, 36, respectively. The RF Modems 25, 35 transmit digital voice and control data between the base station 20 and the handset 30. The base station 20 and handset 30 also have Audio Modems 21, 31 that respectively provide voice transport between the base station 20 and the PSTN and between the handset 30 and a microphone 32 and a speaker 33. Finally, the base station 20 and the handset 30 both have a system controller 27, 37, respectively, for call processing and control functions. The controllers 27, 37 function to provide the protocol for the Radio Modems 28, 38 to allow link establishment, maintenance, and power management.

The preferred RF Modem 35 is a direct conversion transceiver. For transmit, analog wave-shaped baseband data (TXD) is modulated directly to the carrier frequency. For receive, the carrier is directly converted to analog baseband in-phase (RXI) and quadrature (RXQ) signals. The preferred DCT 10 uses frequency division multiple access (FDMA) channelization which, in the 26 MHz-wide ISM band, provides 21 frequency channels at 1.2 MHz channel spacing.

The preferred Baseband Modem 36 is a narrow-band direct sequence spread spectrum (DSSS) burst modem that supports FDMA channelization and time division duplexing (TDD). The preferred transmit and receive time slots are both 2 ms wide, providing a 4 ms Tx/Rx superframe. The preferred modulation for data is differentially encoded Binary Phase Shift Keying (BPSK), and for the spreading code is BPSK. The differential encoding of the data is done such that a change of polarity over a bit interval represents a "−1" and a continuity of polarity represents a "+1."

The DCT 10 preferably uses bipolar signalling where +1 volt signal represents a binary "1" and a −1 volt signal represents a binary "0". Each bit is preferably direct sequence spread spectrum modulated with a 12-chip spreading code. The preferred spreading code repeats on bit boundaries so that, it remains "as is" when multiplied by a binary "1" (+1 volt) and is inverted when multiplied by a binary "0" (−1 volt). The preferred bit rate is 80 kHz, whereby the chip rate for the preferred 12-chip spreading code is 960 kHz (12×80 kHz).

Figure 10:
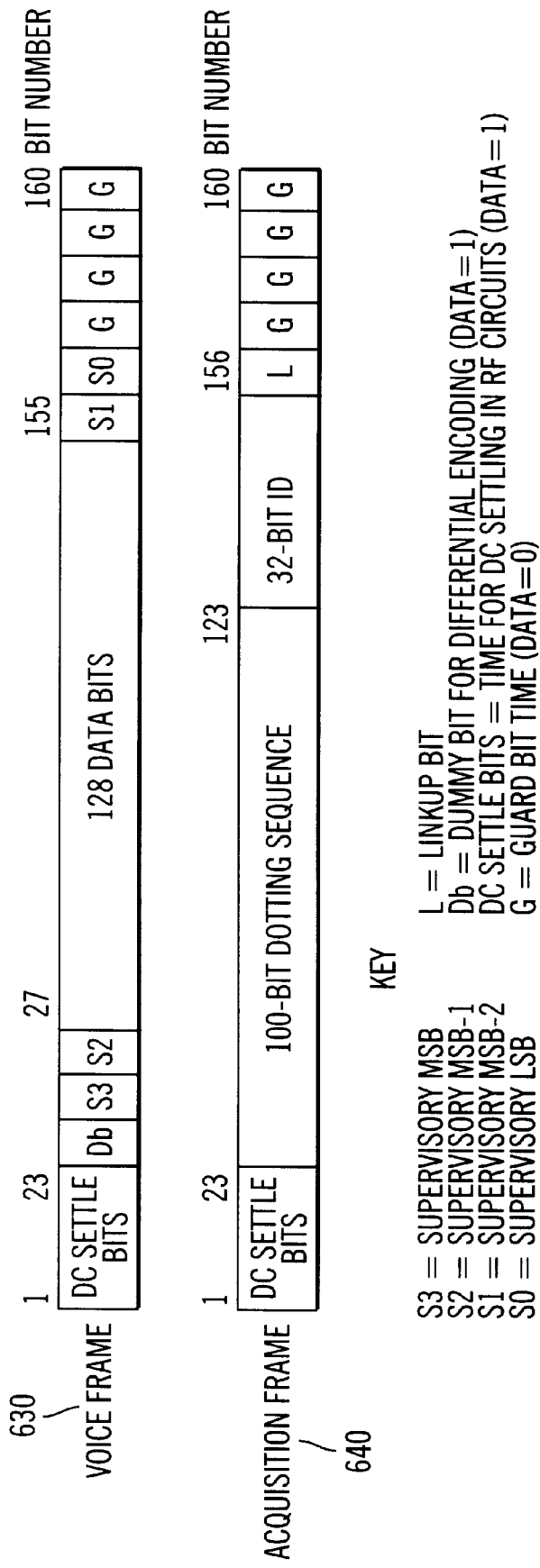
FIG. 10 shows the structure for two types of data frames used in a preferred embodiment, an acquisition frame (A-frame) and a voice frame (V-frame)
Figure 11:
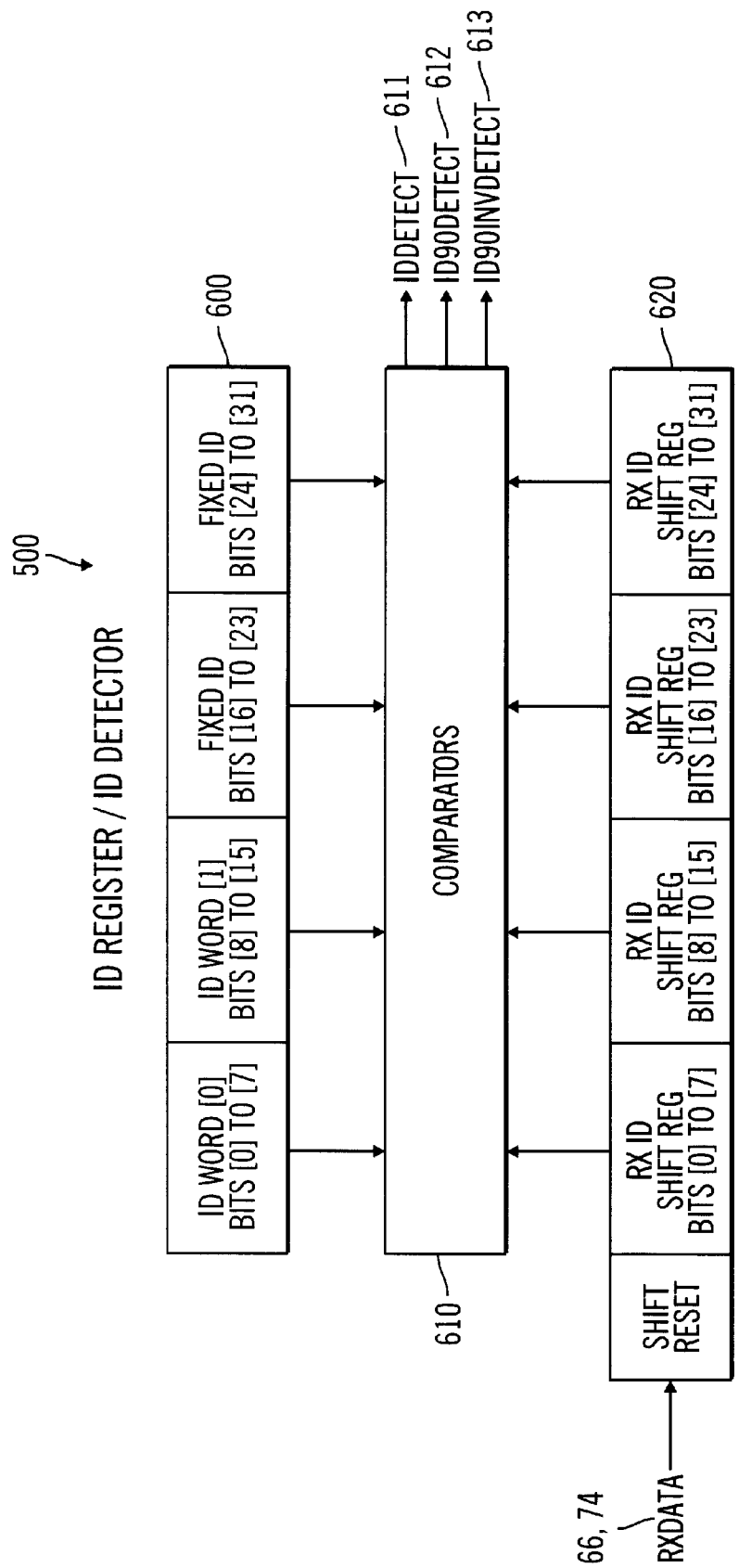
FIG. 11 is a block diagram showing the ID Register and ID Detector.

FIG. 10 shows the preferred 160-bit frame structures for a voice frame (V-frame) and an acquisition frame (A-frame). In the V-frame, the "Db" bit (24) is always "+1" to provide an initial phase reference for decoding the differentially encoded data during reception. In the A-frame, the first 23 bits (1–23) are all DC settle bits (all "1"s), which allow for DC settling of bias circuits in the RF Modem 35. The next 100 bits (24–123) are dotting bits (1,0.1,0, . . . repeated), used by the Baseband Modem 36 for timing acquisition and tracking during an initial reception. The next 32 bits (124–155) are an ID word, followed by an "L-bit" (156) which is used to request an RF link response. Finally, there are 4 guard bits (157–160), which account for radio propagation and circuit delays.

Figure 2:
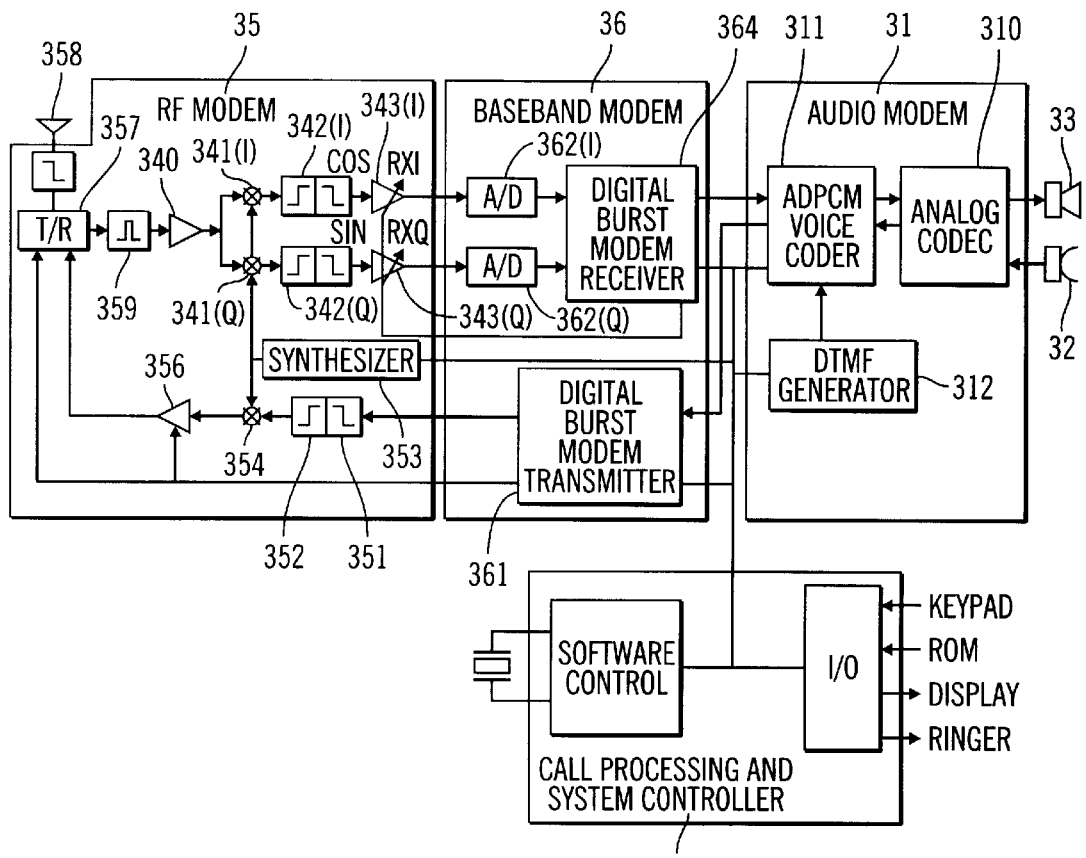
FIG. 2 is a functional block diagram of the RF Modem, Baseband Modem, Audio Modem, and Controller of the handset, the functional blocks of the base station being identical.

Referring to FIG. 2 in more detail, the preferred RF Modem 35 is shown to have a lower transmit path and an upper receive path. A common frequency synthesizer 353 provides the local oscillator frequency needed for modulation and demodulation. For transmission, the RF Modem 35 receives digital spread spectrum data TXD from the Baseband Modem 36, and passes the data TXD through a pair of filters 351, 352 to a modulator 354 where it directly modulates the RF carrier. The first filter 351 is preferably a 10 kHz high pass filter 351 for removing any DC contributed by bias networks and the second filter 352 is preferably a 650 kHz low-pass filter for spectral shaping. The modulated signal is then amplified using a variable output amplifier 356 and routed to a Transmit/Receive (T/R) switch 357 for transmission by an antenna 358. For reception, the T/R switch 357 selects the receive path from the antenna 358, filters the received signal through a band-pass filter 359 to reject out-of-band signals, and then amplifies the filtered signal with a low noise amplifier 340. The signal then enters a pair of mixers 341(I), 341(Q) that down-convert it to analog in-phase (RXI) and quadrature (RXQ) spread spectrum signals. The analog spread spectrum signals RXI. RXQ are then passed through a pair of high-pass/low-pass filter blocks 342(I), 342(Q), respectively, to provide FDMA channel selectivity. Finally, each spread spectrum signal RXI, RXQ is amplified with programmable gain amplifiers 343 (I), 343(Q) to bring the signal up to proper voltage levels.

With continued reference to FIG. 2, the Baseband Modem 36 is shown to have a transmitter block 361 and a pair of Analog-to-Digital Converters (ADCs) 362(I), 362(Q) that feed a receiver block 364. During transmission, the transmitter block 361 takes analog baseband data from the Audio Modem 31, digitizes it, differentially encodes it, combines it with a spreading code, and then provides the resulting digital spread spectrum data TXD to the RF Modem 35 where it directly modulates the carrier for transmission. During reception, the ADCs 362(I), 362(Q) convert the RF Modem's analog spread spectrum signals RXI, RXQ into digital spread spectrum data I, Q. The receiver block 364 receives the digital spread spectrum data I, Q. It then removes the spreading code to recover the digital baseband data, decodes the differentially encoded data, and provides the resulting digital baseband data to the Audio Modem 31 for acoustic reproduction on the speaker 33.

Figure 3:
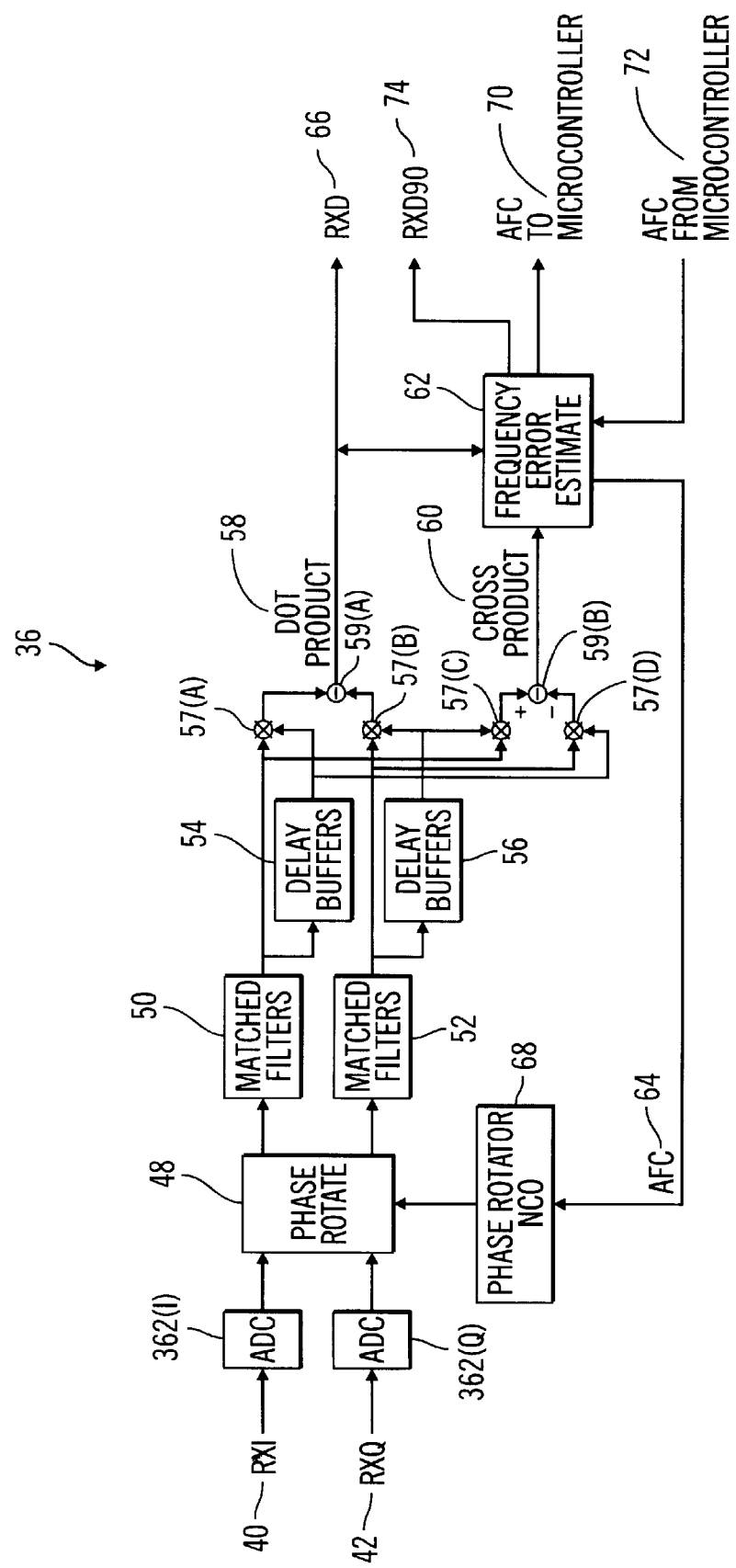
FIG. 3 is a block diagram of part of the Baseband Modem showing more detail than FIG. 2.

FIG. 3 shows the major functional blocks of the Baseband Modem 36 in further detail. As shown, the in-phase and quadrature analog signals RXI 40, RXQ 42 are provided to the ADCs 362(I), 362(Q) for conversion to corresponding digital signals I, Q. The preferred ADCs 362(I), 362(Q) sample the analog baseband signals RXI 40, RXQ 42 at 1.92 MHz (2 times the chip rate) and convert such analog signals into a series of 4-bit, 2's complement, digital signals I, Q. The ADCs preferably implement the following quantization values to reduce the data-movement requirements (ensuring the least significant bit (LSB) is always "1" so it may be implied) and to simplify later multiplication of the digital spread spectrum signals I, Q by ±1 (requiring only a simple inversion of the most significant three bits):

1001 (−7)

1011 (−5)

1101 (−3)

1111 (−1)

0001 (+1)

0011 (+3)

0101 (+5)

0111 (+7)

Figure 4:
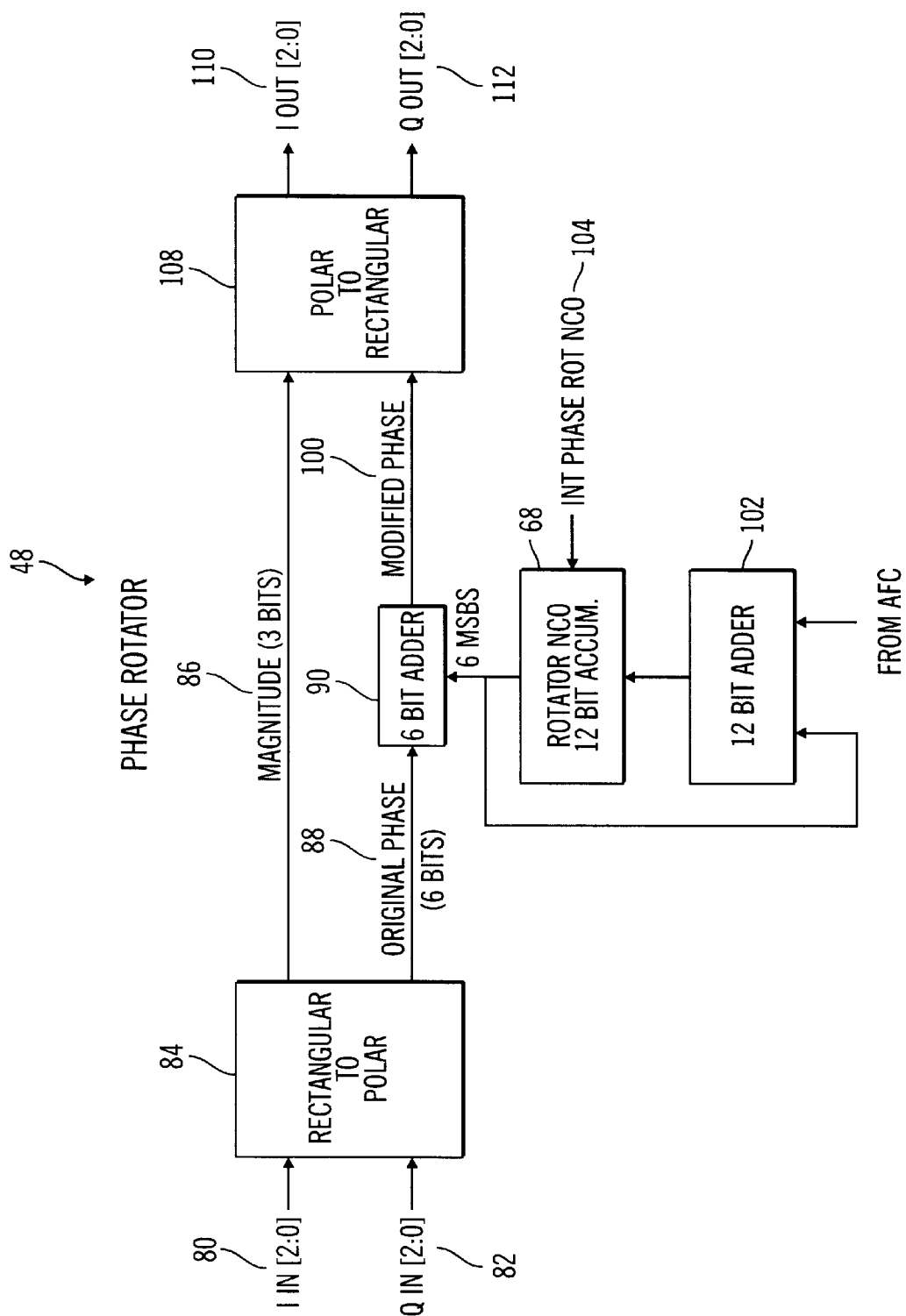
FIG. 4 is a block diagram of a preferred embodiment of the Phase Rotator block shown in FIG. 3.

The digitized RXI 40 and RXQ 42 signals are then multiplied by [cos(ø(t)+jsin(ø(t))] by the Phase Rotator 48, FIG. 4. where ø(t) represents the frequency value supplied by the Numerically Controlled Oscillator (NCO) 68. If "PhaseRotatorNCO" equals ø(t), this function may be represented as:

$$I=I^*\cos(\text{PhaseRotatorNCO})-Q^*\sin(\text{PhaseRotatorNCO})$$

$$Q=Q^*\sin(\text{PhaseRotatorNCO})+Q^*\cos(\text{PhaseRotatorNCO})$$

Phase Rotator 48 performs this function by first converting the digitized RXI 40 and RXQ 42 signals from rectangular to polar form by Rectanoular to Polar converter 84 form as shown in FIG. 4. In polar form, the I In 80 and Q In 82 signals (corresponding to digitized RXI 40 and RXQ 42, respectively) are represented with three Magnitude bits 86 and six Phase bits 88 which are determined by converting the six input bits into nine output bits as shown in FIG. 5. Small input signals are revectored to a minimum amplitude during the Phase Rotator 48 calculations to reduce quantization noise of the output phase, thus improving performance.

The Original Phase 88 component of the I In 80 and Q In 82 signals is modified by the six MSBs from the NCO Accumulator 68. The Six-Bit Adder 90 adds the Original Phase 88 with the six MSBs of the NCO 68 value and outputs a Modified Phase 100. The Magnitude 86 and Modified Phase 100 bits are then converted back to rectangular form by the Polar to Rectangular converter 108 which maps the bits as shown in FIG. 6. I Out 110 and Q Out 112 are once again four-bit two's complement numbers (−7, −5, −3, −1, 1, 3, 5, 7), with only the three MSBs input to Matched Filters 50, 52 (FIG. 3). The initial value 104 for the Phase Rotator NCO 68 in FIG. 4 is set to an initial value before AFC tracking begins.

Figure 7:
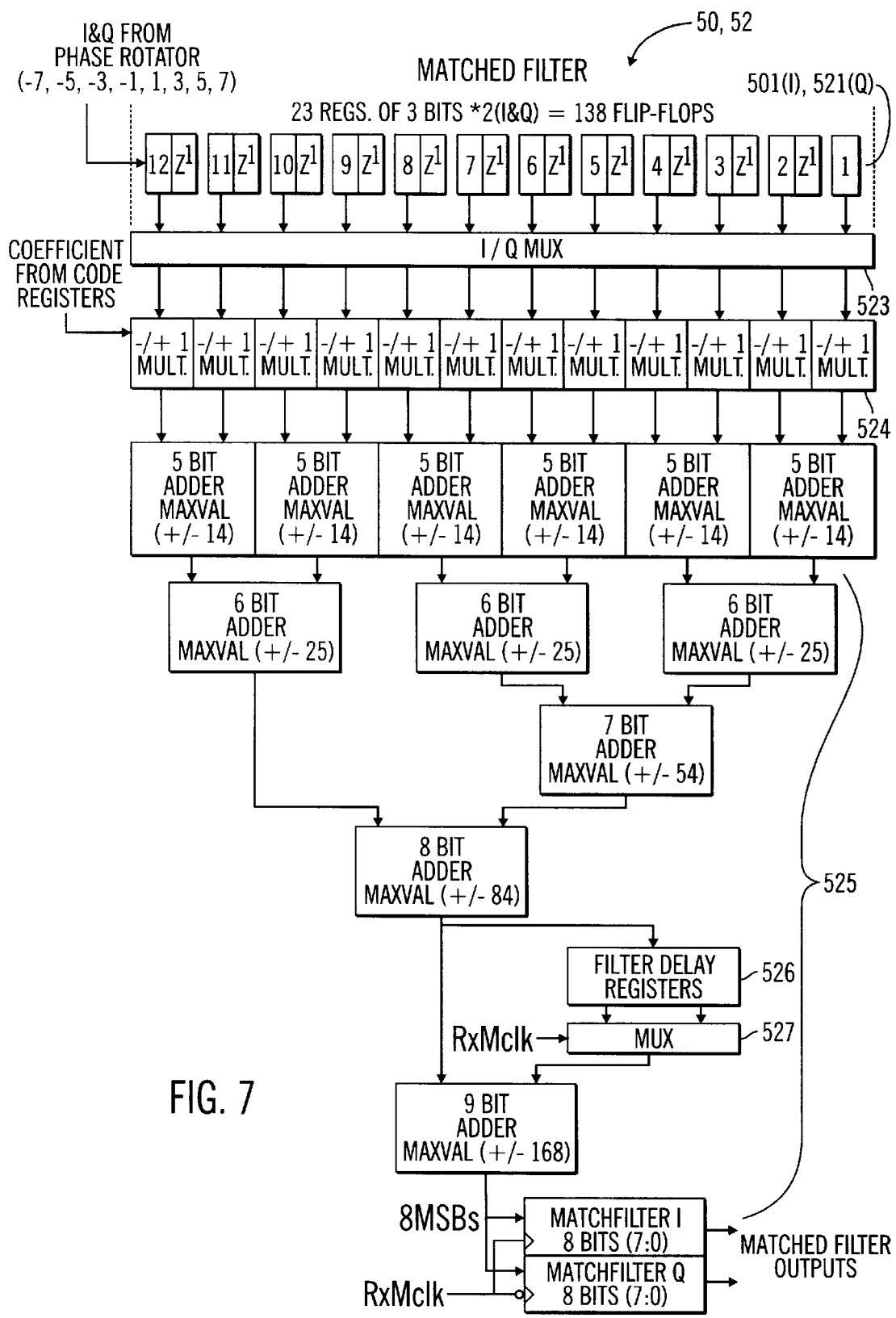
FIG. 7 is a block diagram of a preferred embodiment of the Matched Filter blocks shown in FIG. 3.

The I Out 110 and Q Out 112 data which is output by Phase Rotator 48 is input to Matched Filters 50, 52 (FIG. 3) for removal of the spread spectrum spreading code. FIG. 7 shows a preferred construction for the matched filters 420(I), 420(Q). In operation, the digital data I, Q from the ADCs 362(I), 362(Q) are simultaneously clocked into two, separate 23-long series of 3-bit registers 422(I), 422(Q) at the ADC sampling rate of 1.92 MHz. As already mentioned, 1.92 MHz is 2 times the chip rate of 980 kHz. A total of 24 samples are obtained, therefore, for each bit that was modulated by our 12-chip spreading code—two samples for each chip interval.

The two matched filters 420(I), 420(Q) are preferably implemented, as shown, by time-sharing a coefficient multiplier 424 and a summing network 425. An I/Q MUX 423 is used to alternately provide the I data, and then the Q data, to the coefficient multiplier 424 and the summing network 425. Since the Matched Filters 420(I), 420(Q) are oversampled to 24 samples per bit, the filter's coefficients are also oversampled to 24 (12chips*2 samples/chip) with zero insertion between taps.

The filter coefficients are +1 for One Code Bits, and −1 for Zero Code Bits. For example, a 12-chip spreading code of:

1 1 1 0 0 0 1 0 0 1 0 would result in the following coefficients used for multiplication:

+1, +1, +1, +1, −1, −1, −1, +1, −1, −1, +1, −1

The multiply operation is beneficially simplified by having already limited the digital signals I, Q to 4-bit, 2's complement values of (−7, −5, −3, −1, 1, 3, 5, 7). Multiplying by −1 simply requires an inversion of the 3 MSBs and multiplication by +1 requires no change at all.

The preferred circuit of FIG. 7 further minimizes hardware by summing 24 values in 12-value increments. This 12+12 summing is effected by summing the first 12 values for I & Q, storing these values in filter delay registers 426, and then adding such values to the next 12 values through a summing MUX 427. Note that only 12 of the 23 values held in the shift registers 422(I), 422(Q), or every other one, are passed through the I/Q MUX 423 at any one time, 11 of the other 12 values being temporarily held between the first values that are passed and the 12th value coming in from the Phase Rotator 68.

The maximum output of the matched filters is ±168, values that would occur only if the digital spread spectrum data I, Q from the ADCs was arriving at ±7 and all 24 samples were in perfect code correlation (24*7=168). The peak correlation values from the matched filters will typically be significantly less than the maximum, because the ADCs will calibrate under ±7.

After the spread spectrum code has been removed, the data is demodulated by using I and Q matched filter data which is exactly one bit time apart. The Dot Product 58 (FIG. 3) is calculated according to the following equation:

$$\text{Dot Product}=I^*I(\text{delayed one bit})+Q^*Q(\text{delayed one bit})$$

The Delay Buffers 54, 56 provide the required I and Q data delayed by one bit time. The multipliers 57(A), 57(B), 57(C), 57(D) in combination with the adders 59(A), 59(B) calculate the Dot Product 58 as shown in FIG. 3. Due to the type of differential encoding used, BPSK, a positive Dot Product value represents a zero (no change in phase) and a negative Dot Product value represents a one (change in phase). The demodulated Dot Product 58 is output as received data RXD 66.

The Cross Product 60 of I and Q is also calculated using the same Delay Buffers 54. 56, multipliers 57(A). 57(B), 57(C), 57(D) and adders 59(A), 59(B) as the Dot Product 58 calculation. The demodulated Cross Product is output as RXD90 74. The Cross Product 60 may be implemented by the above hardware according to the following equation:

$$\text{Cross Product}=I^*Q(\text{delayed one bit})-Q^*I(\text{delayed one bit})$$

Figure 8:
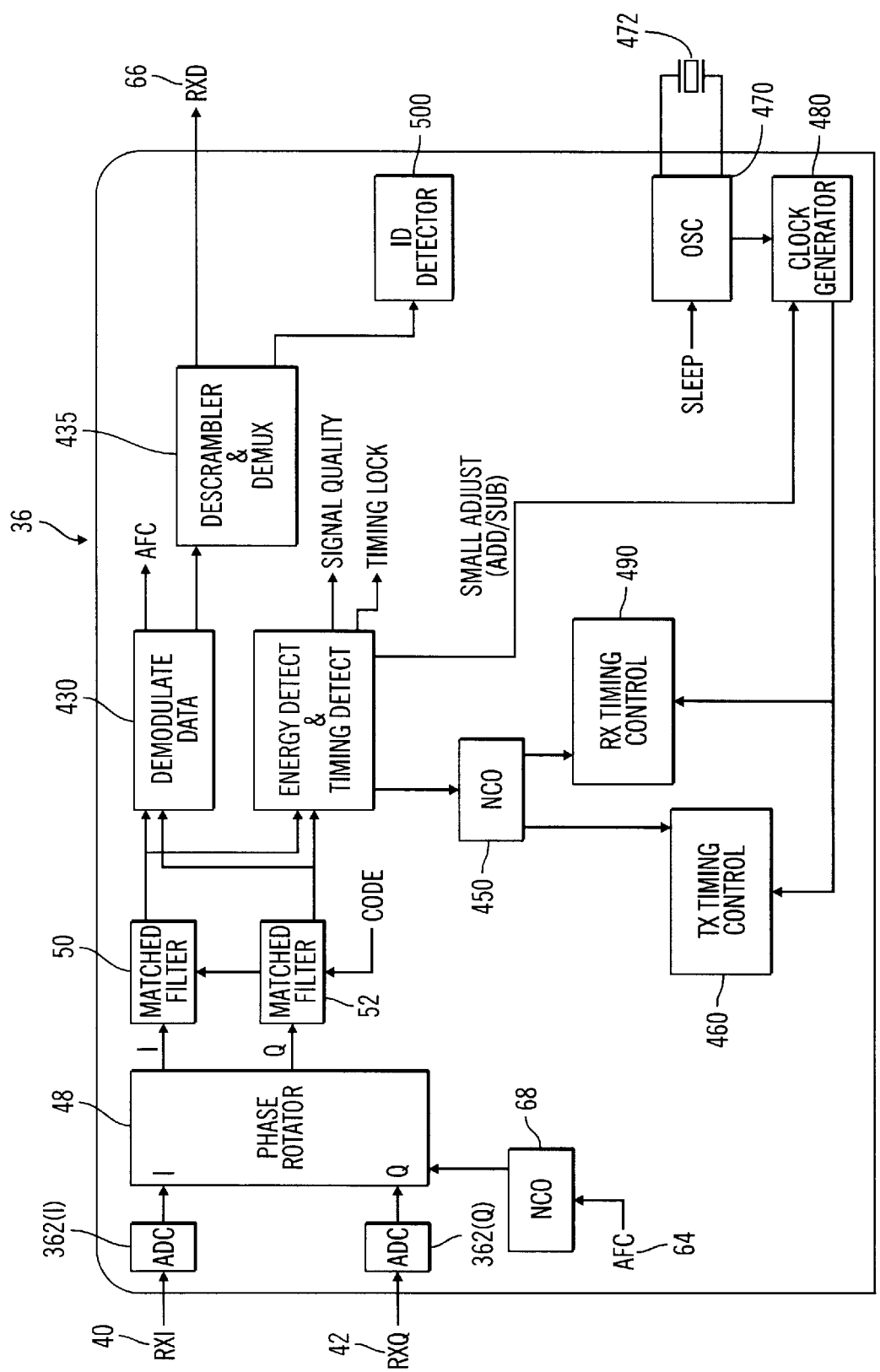
FIG. 8 is a block diagram of part of the Baseband Modem showing more detail than FIG. 8.

In FIG. 8, the Baseband Modem 36 includes Tx Timing and Rx Timing Control Blocks 460, 490 that are nominally driven by a system clock source consisting of a reference oscillator 470 and its associated crystal 472. The reference oscillator 470 preferably oscillates at 9.6 MHz and drives a main clock generator circuit 480 that, in turn, provides lower frequency clocking for transmission and reception via dividers in the Tx Timing and Rx Timing Control Blocks 460, 490.

For transmit purposes, the Baseband Modem 36 has two timing synchronization modes: "Master" or "Slave." Either the basestation 20 or the handset 30 can be the Master, depending on which is initiating the RF link. The noninitiating unit become the Slave. If the Baseband Modem 36 is operating as the Master, then its transmit timing is derived from its own free-running clock source. If the Baseband Modem 36 is operating as a Slave, then its transmit timing is slaved to the signal received from the transmitting Master source. The Rx timing is always derived from the received signal, however, regardless of whether the Baseband Modem 36 is operating as a Master or a Slave when transmitting.

As generally suggested by FIG. 8, the Baseband Modem 36 synchronizes Rx Timing (always Slave mode) and Tx Timing (sometimes Slave mode) by controlling the main clock generator circuit 480 with a "Small Adjust" Add or Subtract pulse.

Figure 9:
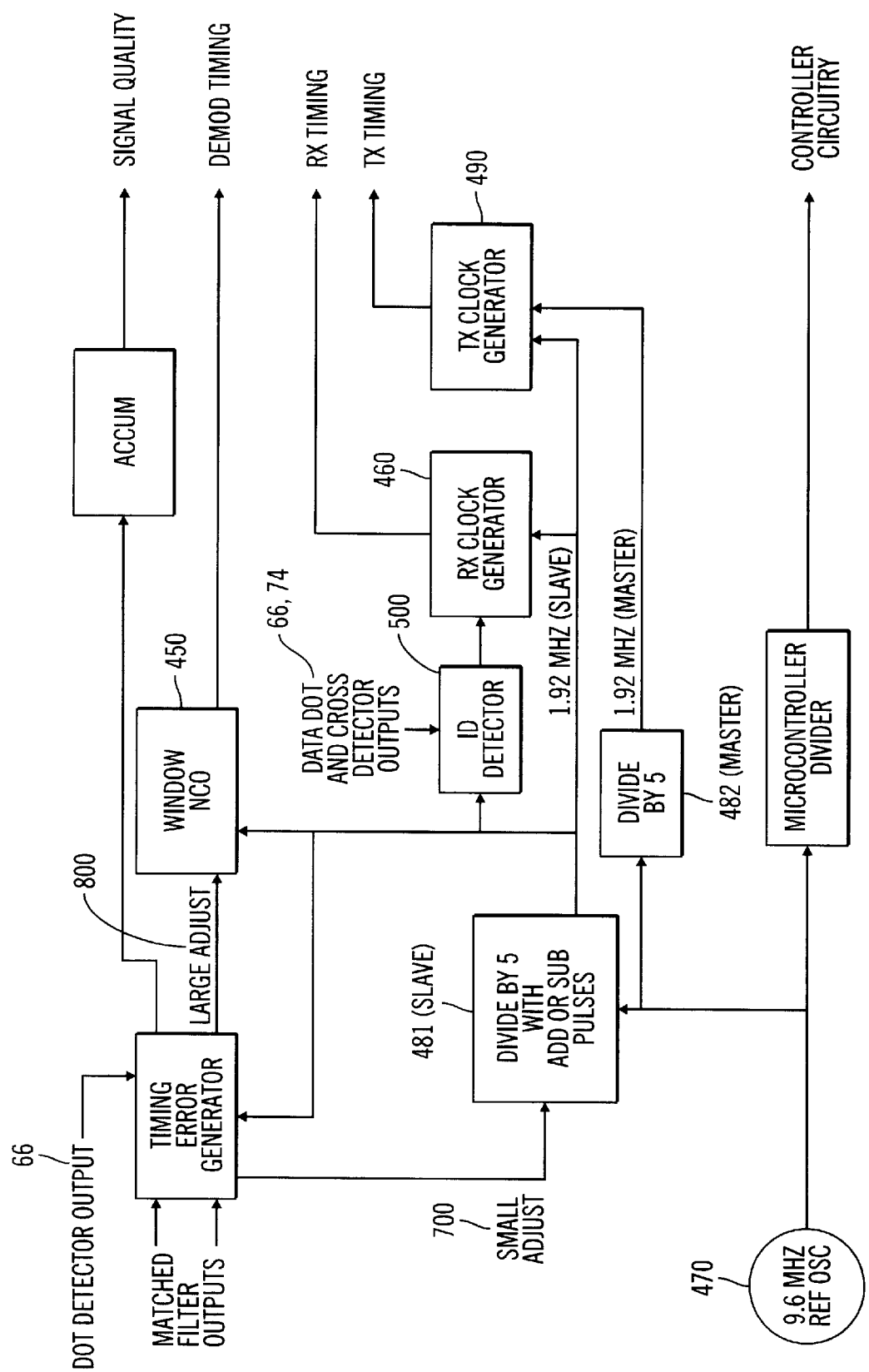
FIG. 9 is a functional block diagram showing the generation of timing clocks in the Baseband Modem of FIG. 3.

As shown more clearly in FIG. 9, the clock generator 480 preferably generates the slower clocks pulses used for Tx and Rx Timing by dividing the 9.6 MHz output of the reference oscillator 470 through a pair of divide-by-5 dividers that nominally output 1.92 MHz main clocks: (1) a Slave Clock Divider 481, and (2) a Master Clock Divider 482. The Master Clock Divider 482 is only connected to the Tx Timing Block 490, whereas the Slave Clock Divider 481 is connected to both the Rx Timing and Tx Timing Blocks 460, 490. The Slave Clock Divider 481 is adjustable by +1 pulse whereby it will divide by 4 or 6, instead of by 5, for one cycle. In other words, the Slave Clock Divider 481 ordinarily divides the reference oscillator's 9.6 MHz output by 5 to produce a 1.92 MHz clock. However, given a Small Adjust Add or Adjust Subtract pulse, the Slave Clock Divider 481 will temporarily require one more or one less 9.6 MHz pulse, respectively, before outputting a pulse. As a result, the output pulse train from the Slave Clock Divider 481 is either slightly advanced or slightly retarded by the duration of one reference clock pulse (1/9.6 MHz=0.1042 $\mu$S).

Initial bit and frame timing are established in the basestation 20, or handset 30, by receiving the A-Frame 640 shown in FIG. 10. In general, the receiving device's Baseband Modem hears the A-Frame 640, uses the dotting sequence (1,0,1,0, . . . repeated) and a "Large Adjust" 800 (FIG. 9) timing loop to coarsely position the "Demodulation Window" for each Rx Frame (i.e. to establish when to periodically look at the output of the matched filters), tries to decodes the ID word that would be contained in a valid A-frame 640, and if it succeeds in decoding the ID word, sets its frame timing to coincide with the time the ID word occurred. Once bit and frame timing has been initialized, the receiver shifts into tracking mode for further demodulation using a "Small Adjust" 700 (FIG. 9) timing loop. If necessary, the receiver returns to the "Large Adjust" 800 timing loop to maintain or reacquire synch.

Figure 12:
FIG. 12 is a table showing the frequency adjustment made depending on whether the demodulated ID matches the dot, cross or inverted cross product of the ID stored in the ID Register.
Figure 13:
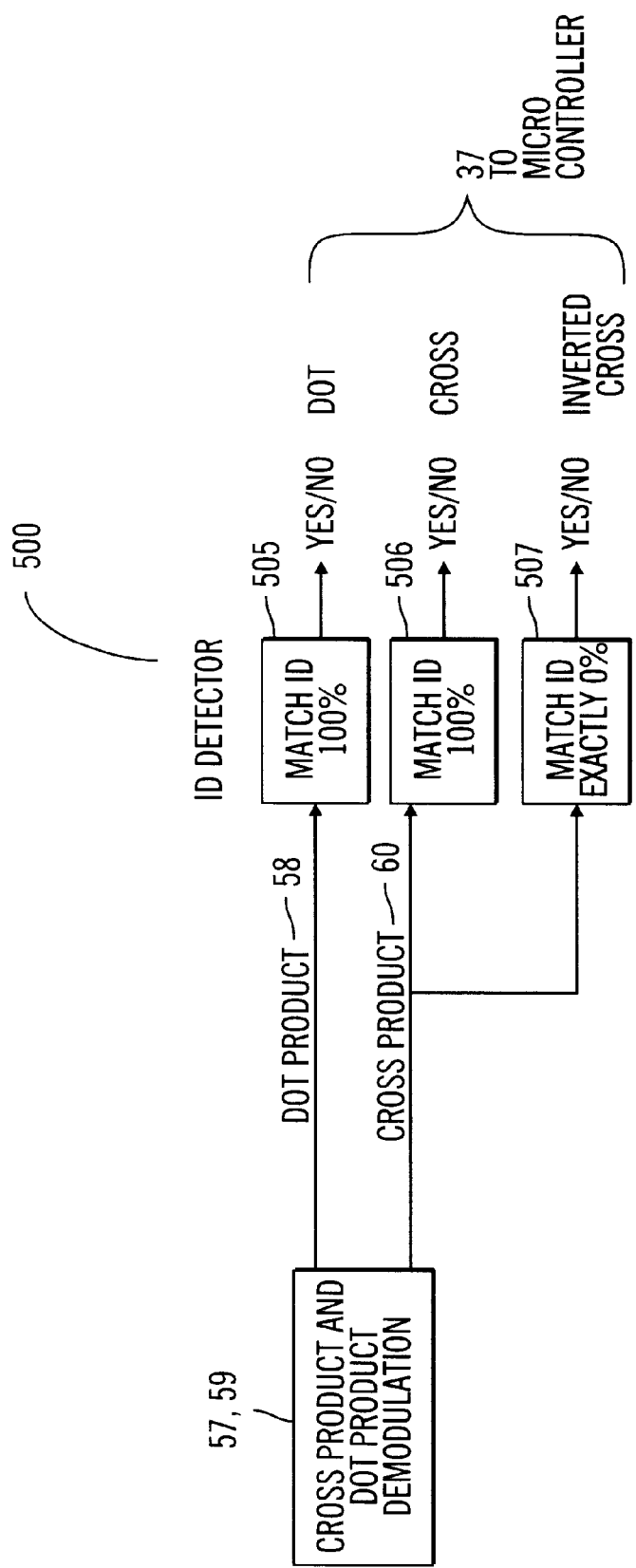
FIG. 13 is a block diagram showing the ID Detector outputting three match detect signals.

The ID word of a received A-frame is demodulated by using both a dot product RXD 66 and a cross product RXD90 74. The received data 66, 74 is input to the ID Detector 620 and compared to the ID word stored in the ID Register 600. For a match to be found, all bits of the ID word of the ID Register 600 must match either the dot product data, cross product data, or all bits exactly mismatch the cross product data in which case the inverted cross product matches. In a preferred embodiment, the ID word is 32 bits long, with bits 16–31 fixed at the Hexadecimal value 6785 to reduce false ID detects, and bits 0–15 are programmable. As shown in FIG. 9, the output of the ID Detector 500 is input to the Rx Clock Generator to adjust frame acquisition timing as discussed above. The output of the ID Detector 500 is also output to the system microcontroller 37 through a control line 70 (FIG. 3) in order to update the AFC tracking. FIG. 12 shows the values by which the AFC value will be modified by the system microcontroller 37 depending on whether the dot product, cross product or inverted cross match the ID word. In FIG. 12, a "1" represents a match, and a "0" represents no match. As shown in FIG. 13, ID Detector 500 outputs three signals 505, 506, 507 to the microcontroller 37. The microcontroller 37 outputs the value delta 700 through a control line 72 to the Frequency Error block 62. The updated AFC value is then used to modify the Phase Rotator NCO 68, thus updating the frequency compensation.

By using both the dot product and cross product of the ID word, a threefold increase in frequency error handling can be achieved since the cross product signal contains valid information outside the frequency range of just the dot product alone.

Those skilled in the art will appreciate that various adaptations and modifications may be made to the disclosed embodiment without departing from the scope and spirit of the invention. Therefore, it is to be understood that, within the scope of the appended claims, the invention may be practiced other than as specifically described herein.

What is claimed is:

1. In a direct sequence spread spectrum communications system having a master device and a slave device wherein the master device establishes a communications link with the slave device, a frequency acquisition device comprising:

an acquisition frame message comprising an ID word transmitted by the master device and received by the slave device;

a dot product demodulator for determining the dot product of the received acquisition frame message;

a cross product demodulator for determining the cross product of the received acquisition frame message;

a receive clock generator for generating received timing control in the slave device;

an ID word detector for detecting when the ID word has been demodulated by the dot product demodulator and outputting a dot product detect signal and for detecting when the ID word has been demodulated by the cross product demodulator and outputting a cross product detect signal;

a frame timing adjuster for adjusting the timing of the receive clock generator to coincide with a time interval of the ID word when the ID detector outputs a dot product detect signal; and a frequency error estimator which provides an estimate based upon the values of the dot product and cross product detects signals.

2. The frequency acquisition device of claim 1, wherein the ID word detector comprises:

an ID register for storing the ID word in the slave device; and an ID comparator for comparing the dot product demodulator output with the ID word stored in the ID register, wherein the ID comparator outputs a detect signal when the dot product demodulator output matches the ID word stored in the ID register.

3. In a direct sequence spread spectrum digital cordless telephone system, a frequency acquisition and compensation device comprising:

an acquisition frame message comprising an ID word transmitted by a handset and received by a bay station or transmitted by the bay station and received by the handset;

a dot product demodulator for determining the dot product of the received acquisition frame message;

a cross product demodulator for determining the cross product of the received acquisition frame message;

an ID register for storing the ID word;

an ID word detector for detecting when the ID word stored in the ID register matches an output of the dot product demodulator, and output of the cross product demodulator or an inverse of the output of the cross product demodulator; and outputting three detect signals corresponding to the dot product match, and inverse cross product match, respectively;

a receive clock generator for generating receive timing control;

a frame timing adjuster for adjusting the receive clock generator to coincide with a timing of the ID word when the ID detector outputs a dot product detect signal; and a computer for outputting a frequency error estimate based on the values of the three detect signals and updating an automatic frequency control circuit.

4. The frequency acquisition and compensation circuit of claim 3, wherein the automatic frequency control circuit comprises:

a phase rotator for adjusting the phase of a received signal by multiplying the received signal by, wherein $\phi(t)$ is a phase value;

a phase rotator accumulator for storing the phase value $\phi(t)$; and an adder for adding the phase value $\phi(t)$ stored in the phase rotator accumulator with the frequency error estimate output by the computer and outputting an updated phase value to the phase rotator accumulator, wherein the phase of the received signal will be adjusted by the updated phase value stored in the phase rotator accumulator.

5. The frequency acquisition device of claim 3 wherein the ID word is 32 bits long and the 16 most significant bits of the ID word are hexadecimal value 6785 to reduce false ID detects.

6. The frequency acquisition device of claim 5 wherein 16 least significant bits are programmable to provide secure data transmission.

* * * * *